(12) United States Patent
Kim

(10) Patent No.: US 6,503,000 B1
(45) Date of Patent: Jan. 7, 2003

(54) PAN/TILT CAMERA

(76) Inventor: Woon Yong Kim, 154-4, Kansuk 2-dong, Namdong-gu, Inchon-City (KR)

( * ) Notice: Subject to any disclaimer, the term of this patent is extended or adjusted under 35 U.S.C. 154(b) by 0 days.

(21) Appl. No.: 09/610,602

(22) Filed: Jul. 5, 2000

(30) Foreign Application Priority Data

Jul. 9, 1999 (KR) ............................................. 99-27690

(51) Int. Cl.[7] ............................................. G03B 17/00
(52) U.S. Cl. ....................................... 396/427; 348/143
(58) Field of Search .................. 396/427; 348/143–159

(56) References Cited

U.S. PATENT DOCUMENTS

| | | | |
|---|---|---|---|
| 4,855,838 A | 8/1989 | Jones et al. | |
| 5,268,734 A | 12/1993 | Parker et al. | |
| 5,463,432 A | 10/1995 | Kahn | |
| 5,598,207 A | * 1/1997 | Kormos et al. | 348/148 |
| 5,802,412 A | 9/1998 | Kahn | |
| 5,850,579 A | * 12/1998 | Melby et al. | 396/427 |
| 6,147,701 A | * 11/2000 | Tamura et al. | 348/143 |

* cited by examiner

*Primary Examiner*—David M. Gray
(74) *Attorney, Agent, or Firm*—Flynn, Thiel, Boutell & Tanis, P.C.

(57) ABSTRACT

A pan/tilt camera apparatus effectively photographs an object by adjusting a camera to a desired direction according to motion of the object through controlling a pan movement unit for horizontal rotation and a tilt movement unit for vertical rotation of the camera at the same time. The pan/tilt camera apparatus includes the camera for photographing an object, a first housing for receiving a part of the camera, the first housing rotating right/left in integration with the camera. The pan/tilt camera includes a tilt movement unit received in the first housing for moving the camera upward/downward, and a pan movement unit connected to the first housing. The pan movement unit moves the first housing right/left in a separate way from the tilt movement unit. A second housing receives the pan driving unit. A control unit generates an interrupt signal for driving both of the tilt and pan movement units according to the interrupt signal, and adjusts directions of the tilt and pan movement units by controlling rotary speeds of the tilt and pan movement units at each interrupt signal in order to move the camera along the path of the moving object.

3 Claims, 4 Drawing Sheets

PAN/TILT CAMERA

BACKGROUND OF THE INVENTION

1. Technical Field

The present invention relates to a pan/tilt camera for intelligently photographing an object, and more particularly to a pan/tilt camera for effectively photographing an object by adjusting the camera to a desired direction according to motion of the object through controlling a pan movement unit for horizontal movement and a tilt movement unit for vertical movement at the same time.

2. Description of the Prior Art

A camera is to photograph an image, of which applications becomes broad in fields of a manless monitoring system, a picture phone, etc. Therefore, there are more needs for a function of rotating the camera to a desired direction.

A pan/tilt camera currently used is configured to move its direction right/left or upward/downward with use of at least two motors for x-axis movement and y-axis movement. A controller used for adjusting a direction of such camera employs a scan and detect method in which a user should directly watch for an object photographed through the camera on a screen of a view finder and intentionally adjust the object to a center of the view finder screen. Such scan and detect method may control the motors respectively with use of a remote controller and rotate the camera right/left or upward/downward along the object.

However, such conventional pan/tilt camera should control each motor for x-axis movement or y-axis movement with use of each function key, which makes movement of the camera unnatural. In addition, the conventional technique has difficulty to quickly capture motion of the object in fact that it takes much time for adjusting a direction of the camera.

SUMMARY OF THE INVENTION

Therefore, the present invention is designed to overcome problems of the prior art. An object of the present invention is to provide a pan/tilt camera, which may adjust its direction right/left and upward/downward at the same time by way of simultaneously controlling right/left rotation and upward/downward rotation thereof.

In order to obtain the object, the present invention provides a pan/tilt camera comprising: a camera for photographing an object; a first housing for receiving a part of the camera, the first housing possibly rotating right/left in integration with the camera; a tilt movement means received in the first housing for moving the camera upward/downward; a pan movement means connected to the first housing, the pan movement means moving the first housing right/left in a separate way from the tilt movement means; a second housing for receiving the pan driving means; and a control means for generating an interrupt signal, driving both of the tilt and pan movement means according to the interrupt signal, adjusting directions of the tilt and pan movement means with controlling rotatory speed of the tilt and pan movement means at each interrupt signal in order to move the camera along the object.

The tilt movement means may include a tilt motor for generating rotative force by using driving force from outside, the control means controlling rotatory speed and direction of the tilt motor; a reduction gearbox engaged with the tilt motor for reducing rotatory speed of the tilt motor to a desired rate; and a tilt gear engaged with the reduction gearbox for receiving the speed-reduced rotative force of the tilt motor, the tilt gear being engaged with a tilt shaft combined with a bracket for fixing the camera in order to rotate the camera upward/downward.

The pan movement means may include a pan motor for generating rotative force by using driving force from outside, the control means controlling rotatory speed and direction of the pan motor; a reduction gearbox engaged with the pan motor for reducing rotatory speed of the pan motor to a desired rate; and a pan gear engaged with the reduction gearbox for receiving the speed-reduced rotative force of the pan motor, the pan gear being engaged with a pan shaft formed vertically in integration with the first housing in order to rotate the first housing right/left.

The tilt motor may be a step motor and the control means may control the rotatory speed of the tilt motor by regulating pulse transmitted to the tilt motor.

The pan motor may also be a step motor and the control means may control the rotatory speed of the pan motor by regulating pulse transmitted to the pan motor.

The tilt shaft may be fixedly combined to the bracket for fixing the camera and rotationally combined to a side of the first housing; and the tilt shaft may rotate the camera and the bracket upward/downward at the same time when the tilt gear is rotating.

The pan shaft may be fixedly combined to a lower portion of the first housing and rotationally combined with a bracket fixed to the second housing; and the pan shaft may rotate the first housing and the camera right/left at the same time when the pan gear is rotating.

In order to perform the object, the present invention provides a pan/tilt camera including a camera for photographing an object; a first housing for receiving a part of the camera, the first housing possibly rotating right/left in integration with the camera, the first housing having a front portion and a rear portion; a housing combining unit for combining the front portion and the rear portion of the first housing; a driving unit received in the first housing for supplying rotative force with use of power from outside; a tilt shaft rotationally combined to both sides of the first housing at a position near the housing combining unit, the tilt shaft rotating the camera upward/downward by the rotative force of the driving unit; a pan shaft fixedly combined to a lower portion of the first housing, the pan shaft extending vertically; a tilt movement unit received in the first housing for moving the camera upward/downward; a pan movement unit for rotating the pan shaft right/left in a separate way from the tilt movement unit; a second housing for receiving the pan driving unit; a bracket combined with the second housing for fixing the pan shaft rotatable; and a control means for generating an interrupt signal, driving both of the tilt and pan movement means according to the interrupt signal, adjusting directions of the tilt and pan movement means with controlling rotatory speed of the tilt and pan movement means at each interrupt signal in order to move the camera along the object.

BRIEF DESCRIPTION OF THE DRAWINGS

These and other features, aspects, and advantages of the present invention will become better understood with regard to the following description, appended claims, and accompanying drawings, in which like components are referred to by like reference numerals. In the drawings:

DETAILED DESCRIPTION OF THE PREFERRED EMBODIMENT

Hereinafter, preferred embodiments of the present invention will be described in detail with reference to the accompanying drawings.

Figure 1:
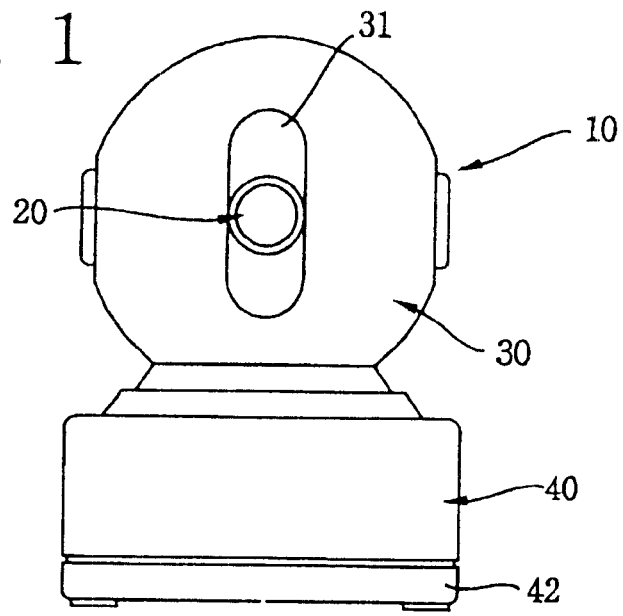
FIG. 1 is a front view for showing a pan/tilt camera according to the present invention.

FIG. 1 is a front view showing whole outer appearance of a pan/tilt camera 10 of the present invention. Referring to the figure, the pan/tilt camera 10 of the present invention includes seemingly a camera 20, a first housing 30 and a second housing 40. The camera 20 is for photographing an image, not limited to a specific one and can be any type of camera which meets needs of the present invention. The camera 20 is received in the first housing 30 and may expose its part required for photographing.

The first housing 30 has a camera guide 31 which is perforated in a predetermined shape to protrude a part of the camera 20. The camera 20 may move upward/downward in the camera guide 31 in a manner described below. For the purpose of the upward/downward movement of the camera 20, the camera guide 31 has an opening formed to extend vertically. In addition, since a lens of the camera 20 is commonly circular, it is preferred that upper and lower ends of the camera guide 31 are rounded in order to escape collision with the camera 20.

The first housing 30 may rotate right/left in a manner described below. In addition, it is preferred in appearance that the first housing 30 has a spherical shape, an oval shape, or the like which is not inappropriate to rotate. The second housing 40 is positioned under the first housing 30. The second housing 40 may have a rectangular shape, and is preferably slightly bigger than the first housing 30. The second housing 40 may have a base 42 at a its bottom position. The base 42 is preferably detachable with the second housing 40 in order to facilitate to check and repair parts in the second housing 40.

Figure 2:
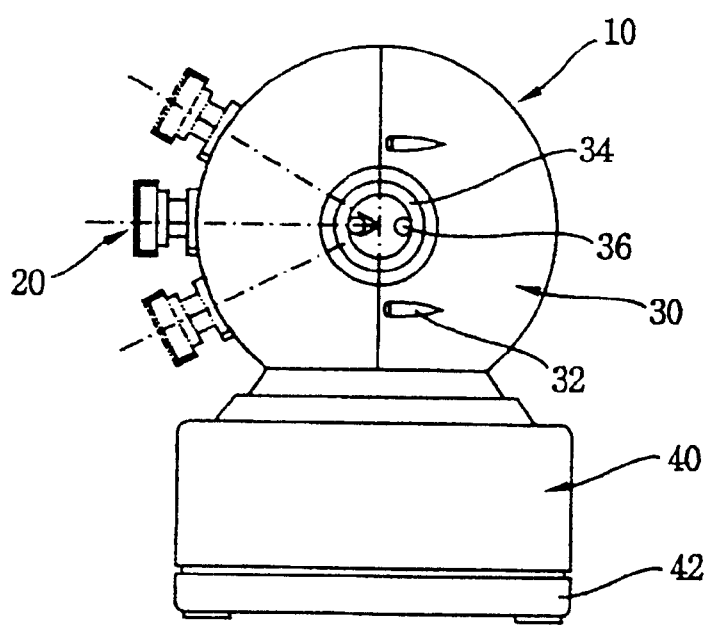
FIG. 2 is a side view of the pan/tilt camera of FIG. 1.

FIG. 2 is a side view of the pan/tilt camera 10 of FIG. 1. Referring to the figure, the first housing 30 has a front portion and a rear portion both of which are manufactured separately and combined each other in assembly. A housing combining unit 32 shown in the figure is used for screw combination when combining the front and rear portions of the first housing 30.

In addition, it can be seen that the camera 20 rotates upward/downward approximately on center of a horizontal centerline of the first housing 30. At this time, range of upward/downward rotation of the camera 20 may be regulated optionally, but preferably about ±30° or more as required. In the figure, the camera shown in dashed lines indicates maximum position within which the camera 20 may rotate upward/downward when the range of upward/downward rotation is regulated to be ±30°.

At this point, a tilt shaft 68 (see FIG. 5) which may act for a central axis of upward/downward rotation of the camera 20 is combined to the first housing 30. For the purpose of combination of the tilt shaft 68, a tilt shaft combining unit 34 is formed at side ends of the first housing 30. The tilt shaft combining unit 34 may be protruded at side ends of the spherical or oval first housing 30, and a coupling screw 36 may be positioned within the protruded tilt shaft combining unit 34 in order to screw the tilt shaft 68 thereto. At this time, the tilt shaft combining unit 34 may be protruded in a ring shape having a predetermined size in order to prevent the coupling screw 36 from jutting out and have an inward depressed center portion where the coupling screw 36 is located. In addition, the sides of the first housing 30 where the tilt shaft combining unit 34 is positioned may be preferably flattened such that the tilt shaft combining unit 34 may not protrude to excess.

Figure 3:
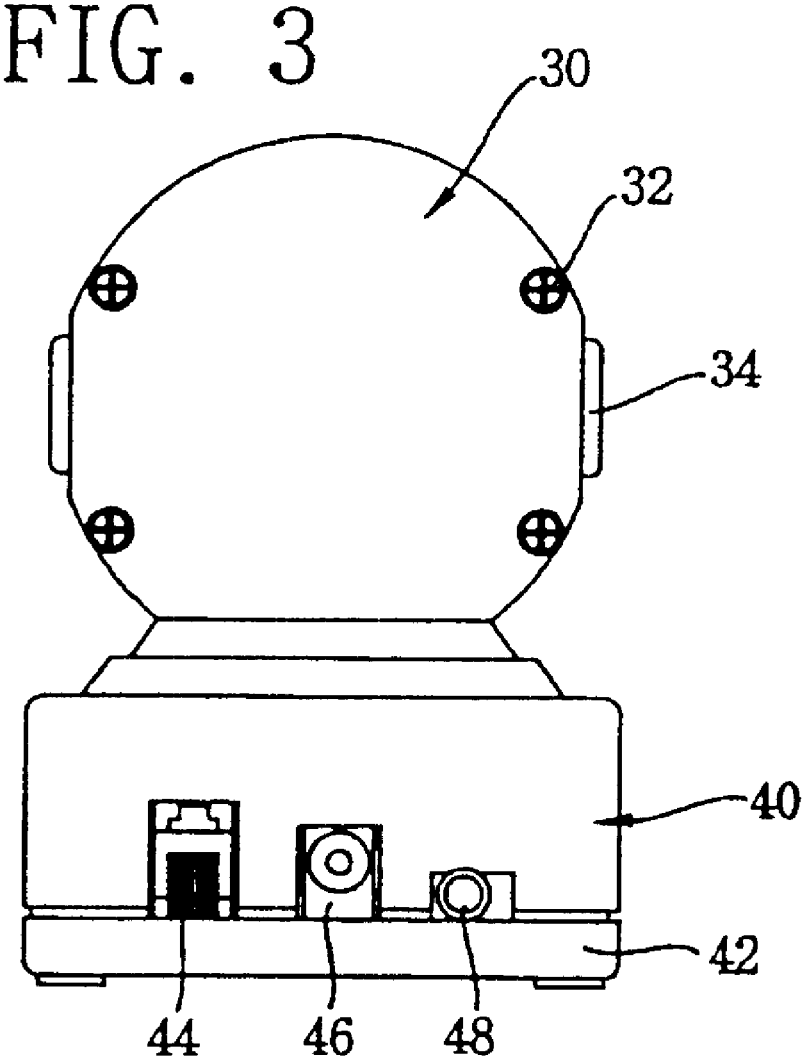
FIG. 3 is a rear view of the pan/tilt camera of FIG. 1.

FIG. 3 is a rear view of the pan/tilt camera 10 of FIG. 1. Referring to the figure, position of the housing combining unit 32 described above is well shown. Preferably, the housing combining unit 32 is formed near the tilt shaft combining unit 34 in the embodiment of the present invention. If the first housing 30 consisting of two portions is combined near the tilt shaft combining unit 34 by the housing combining unit 32, the tilt shaft combining unit 34 becomes structurally securer owing to firm combination of the first housing 30.

In addition, the second housing 40 may include a plurality of connecting ports at its rear side for connection with external devices. In the embodiment of the present invention, the second housing 40 includes a communication port 44 connected to. a computer or another manipulating unit, a video output 46 for transmitting image information photographed by the camera, and a power input 48 for receiving power from outside, which is only an example and can be, of course, varied in real application according to circumstance and needs. In particular, the communication port 44 may employ a connecting unit for a data transmitting terminal or its passage such as a Universal Serial Bus UBS connecting port, a Universal Asynchronous Receiver Transmitter UART, or an RS-232C.

Figure 4:
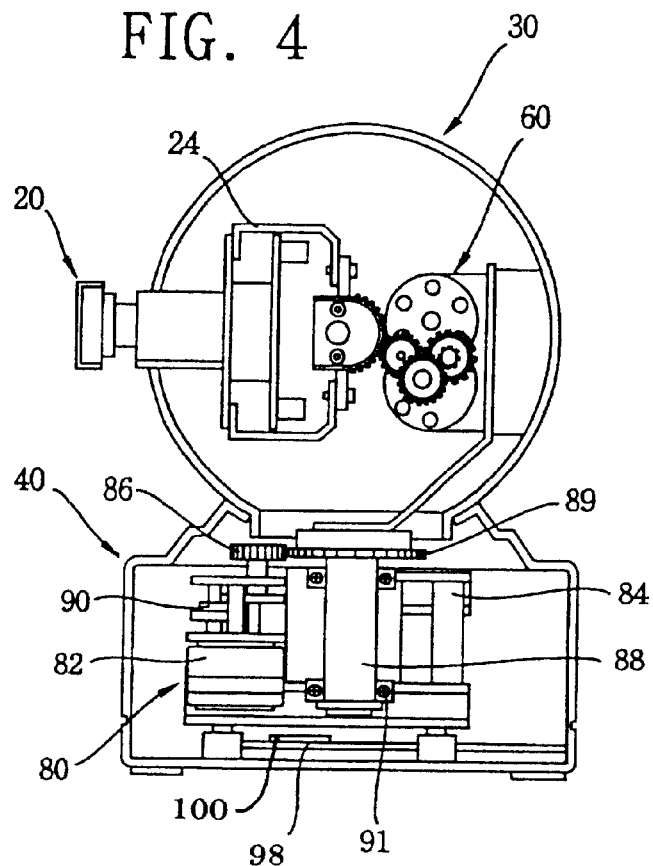
FIG. 4 is a side view for showing inner configuration of the pan/tilt camera according to the present invention.
Figure 5:
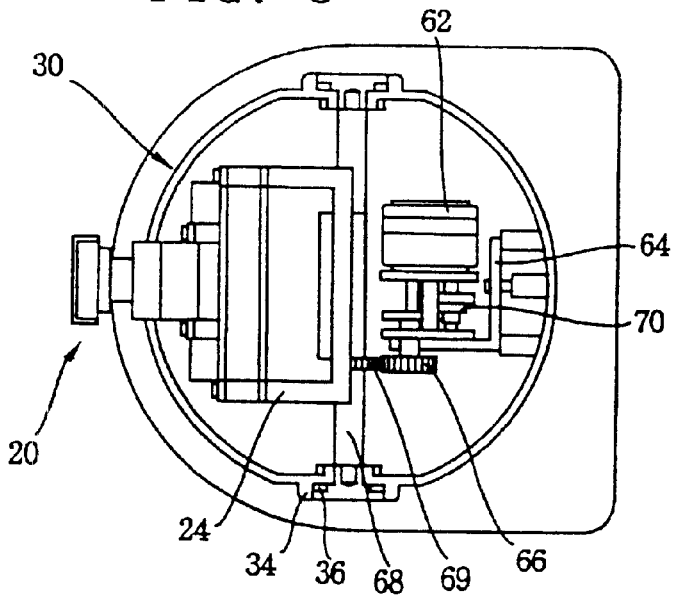
FIG. 5 is a plane view of showing the inner configuration of the pan/tilt camera of FIG. 4.
Figure 6:
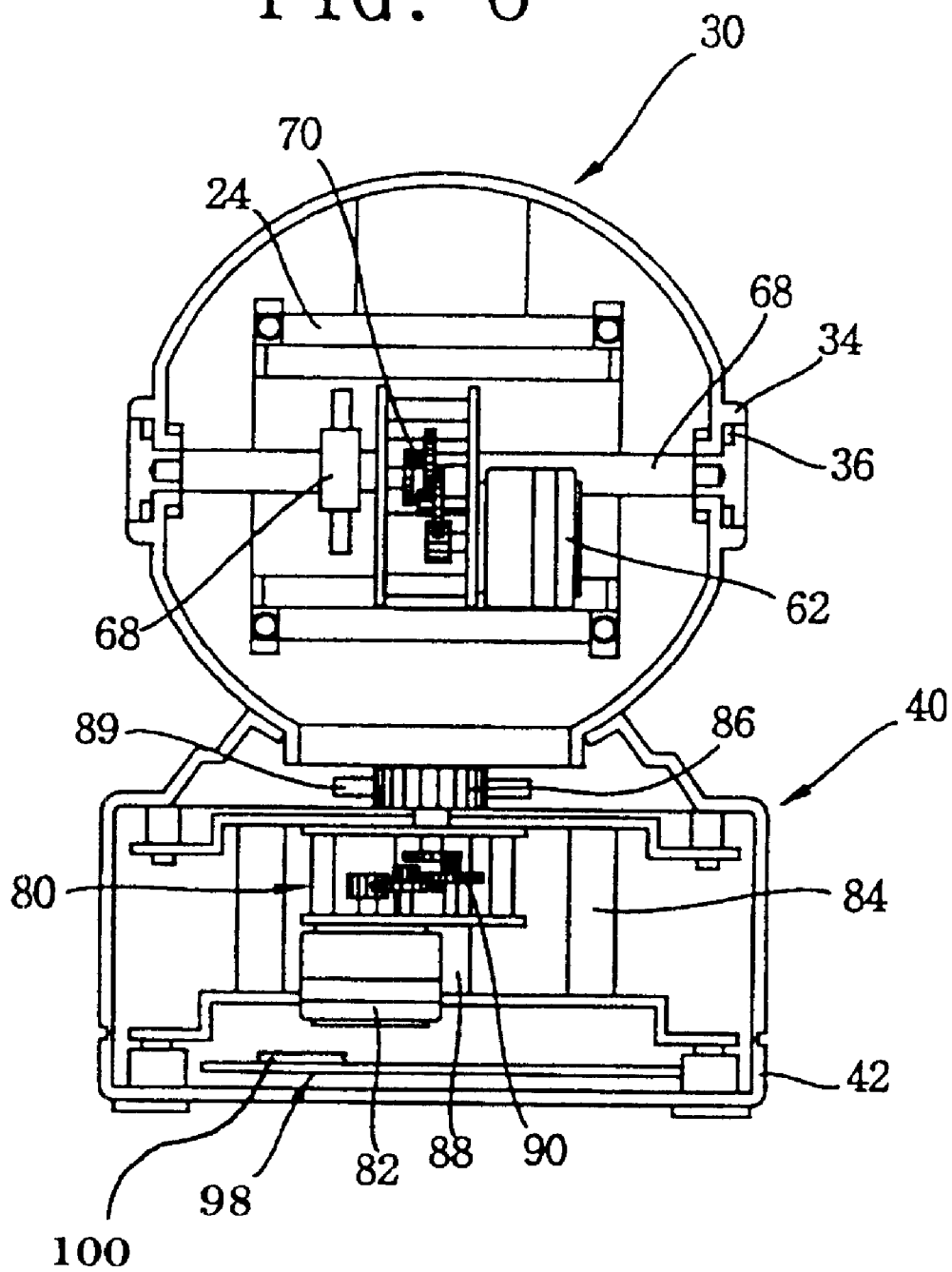
FIG. 6 is a rear view of FIG. 4.

FIG. 4 to FIG. 6 are side, plane and front views showing internal configuration of the pan/tilt camera 10 respectively according to the present invention. Referring to the figures, the pan/tilt camera 10 of the present invention generally includes the camera 20 for photographing an object, the first housing 30 for receiving a part of the camera 20, a tilt movement unit 60 received in the first housing 30 for rotating the camera 20 upward/downward, a pan movement unit 80 connected to the first housing 30 for rotating the first housing 30 right/left in a separate way from the tilt movement unit 60, the second housing 40 for receiving the pan movement unit 80, and a control unit 100 for controlling movement direction and speed of the tilt movement unit 60 and the pan movement unit 80 at the same time.

As shown in the figures, the camera 20 is fixed to a bracket 24 through such as a screw. The bracket 24 is screwed to the tilt shaft 68 fixed to the first housing 30. As described above, the tilt shaft 68 is combined to both side ends of the first housing 30 so to possibly rotate horizontally by the tilt movement unit 60, which is described later. Rotation of the tilt shaft 68 makes the bracket 24 and the camera 20 rotated.

At an approximately opposite position to the camera 20, the first housing 30 has another bracket 64 fixedly combined thereto. The tilt movement unit 60 is fixed to the bracket 64 in order to rotate the camera 20 upward/downward.

The tilt movement unit 60 includes a tilt motor 62 for generating rotative force by using driving force from outside, a reduction gearbox 70 engaged with the tilt motor 62 for reducing rotatory speed of the tilt motor 62 to a desired rate, and a tilt gear 66 engaged with the reduction gearbox 70 and the tilt shaft 68 combined with the bracket 24 for fixing the camera 20 in order to rotate the camera 20 upward/downward.

At this time, the tilt motor 62 may preferably be a step motor or a pulse motor. In addition, it is preferred that the control unit 100 regulates pulse to the motor 62 in order to control rotatory speed of the motor 62.

Since the motor for providing rotary force with use of outside power usually rotates at very high speed, the reduction gearbox 70 is required to reduce the rotatory speed. The reduction gearbox 70 has a plurality of gears with which the rotatory speed of the motor may be reduced to a desired rate. The gears may be various reduction gear ratios such as 1:40, 1:48, 1:50, which is adjustable as requested.

A last gear of the reduction gearbox 70, which rotates at reduced speed, is coaxially integrated with the tilt gear 66, which may rotate the camera 20. The tilt gear 66 is also engaged with the tilt shaft 68 combined with the first housing 30 so to rotate the tilt shaft 68. At this time, the tilt shaft 68 includes a gear unit 69 to engage with the tilt gear 66, which gear unit 69 may be formed at a predetermined position of the tilt shaft 68 or have a separate gear fixed to a predetermined position of the tilt shaft 68. In addition, change of tooth number of the gear unit 60, of course, makes rotatory speed of the tilt gear 66 being regulated one more time.

If the tilt shaft 68 rotates by the tilt gear 66, the camera fixing bracket 24 fixedly combined with the tilt shaft 68 and the camera 20 fixed to the bracket 24 simultaneously rotate upward/downward.

Referring to FIG. 4 again, a pan shaft 88 is vertically attached to a lower end of the first housing 30 which receives a part of the camera 20 and the tilt movement unit 60. The pan shaft 88 acts for a vertical rotary axis of the first housing 30. A lower end of the pan shaft 88 is extended through the second housing 40. The pan shaft 88 is engaged with the pan movement unit 80 within the second housing 40.

The pan movement unit 80 includes a pan motor 82 for generating rotative force by using driving force from outside, a reduction gearbox 90 engaged with the pan motor 82 for reducing rotatory speed of the pan motor 82 to a desired rate, and a pan gear 86 engaged with the reduction gearbox 90 and the pan shaft 88 formed vertically in integration with the first housing 30 in order to rotate the first housing 30 right/left.

Configuration of the pan motor 82 and the reduction gearbox 90 for the pan motor 82 is same as or similar to that of the tilt motor 62 and the reduction gearbox 70 for the tilt motor 62, and not described in detail here.

The reduction gearbox 90 reducing the rotatory speed of the pan motor 82 is engaged with the pan gear 86. The pan gear 86 is also engaged with a gear unit 89 of the pan shaft 88 in order to rotate the pan shaft 88, which is similar to the tilt shaft 68. Since the pan shaft 88 is combined with the first housing 30, rotation of the pan shaft 88 makes the first housing 30 being rotated right/left. At this time, rotating range of the first housing 30 may be regulated to a desired degree, and the embodiment of the present invention regulates the first housing 30 to possibly rotate ±90° right/left. However, the present invention is not limited to that, may select various modification as required. For example, the first housing 30 may rotate round and round, of course.

The pan shaft 88 is also connected to a shaft bearing 91. Because the shaft bearing 91 is fixed to the second housing 40 by a bracket 84, the pan shaft 88 may rotate freely at its fixed position.

The second housing 40 also receives the control unit 100. The control unit 100 is to control rotatory direction and speed of the tilt movement unit 60 and the pan movement unit 80. Though not shown in the figures, the control unit 100 may include a timer, a main processor, and a plurality of memories. The timer periodically generates interrupt signals for driving the tilt motor 62 or the pan motor 82. The main processor controls the tilt motor 62 and the pan motor 82 in turn respectively with modulating rotatory speed according to each of the interrupt signals from the timer. Therefore, the main processor controls the horizontal movement by the pan motor 82 and the vertical movement by the tilt motor 62 of the camera 20 to a desired direction and a desired angle such that the camera 20 may adjust its direction along movement of the object. The memories store data and programs for operating the main processor. The memories may include, for example, a ROM for storing the program to operate the tilt and pan motor 62, 82, a RAM for storing data and a NVRAM (Non Volatile RAM) for possibly storing data used to automatic camera control in case of even a power failure.

This embodiment employs a printed circuit board 98 (PCB) positioned at a bottom of the second housing 40 supporting the control unit 100, which is just an example and may be an onboard type as a separate module or installed to a side of the second housing 40, selectively.

Though not shown well in the drawings, each motor 62, 82 connects with a cable in order to receive power from outside and control signal from the control unit 100. At this time, the pan motor 82 is structurally positioned near the control unit 100 and the power input 48, while the tilt motor 62 is structurally separated therefrom because the tilt motor 62 is in the first housing 30. Therefore, the pan shaft 88 has a cylindrical shape positioned at a connecting portion between first housing 30 and the second housing 40. Through the cylindrical pan shaft 88, a cable is connected to receive image signal from the camera 20 and transmit power and control signals to the tilt motor 62.

While the tilt movement unit 60 and the pan movement unit 80 are installed separately so to make vertical rotation of the tilt movement unit 60 and horizontal rotation of the pan movement unit 80 separately, the present invention has characteristics in that the control unit 100 may control the vertical and horizontal movement at the same time.

For such reason, the control unit 100 compares a screen center of the camera 20 with a center position of an object detected by the camera 20, calculates rotatory direction and angle of the camera 20 to move, and then drives the tilt motor 62 and the pan motor 82 according to the timer pulses in a certain period. When driving the tilt motor 62 and the pan motor 82, the control unit 100 regulates rotatory direction and speed of the motors at each period of the timer pulses and subsequently proceeds such regulation, resulting that the camera 20 may quickly rotate to a desired direction.

The control unit 100 may be configured to operate separately, and possibly connected to an outside computer through the UBS port 44 so to be controlled by a command from such computer.

The present invention as constructed above has an advantage that the camera may quickly adjust its direction toward a desired object by performing right/left rotation and upward/downward rotation at the same time by separate driving units.

In addition, the present invention has another advantage of enhancing time efficiency by controlling right/left and upward/downward rotation of the camera at the same time and facilitating rotatory speed of the camera.

The pan/tilt camera according to the present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A pan/tilt camera apparatus comprising:

a camera for photographing an object;

a first housing for receiving the camera, the first housing having a camera guide enabling a part of the camera to protrude therethrough, the camera guide enabling tilting of the camera relative to the first housing and preventing rotational movement of the camera relative to the first housing;

a tilt shaft disposed inside of and extending across the first housing for supporting the camera, opposing ends of the tilt shaft being rotatably secured to the first housing, the tilt shaft and the camera being fixedly secured to each other;

a tilt movement unit contained within the first housing for driving the tilt shaft and tilting the camera;

a pan movement shaft connected to the first housing for rotating the first housing about a vertical axis so as to pan the camera;

a pan movement unit for rotating the pan movement shaft and the first housing; and a second housing positioned essentially entirely below the first housing and supporting the first housing, the second housing receiving the pan movement unit, wherein, in operation, the first housing rotates about the pan movement shaft to pan the camera, and wherein the tilt movement unit rotates the tilt shaft and tilts the camera without moving the first housing.

2. The pan/tilt camera apparatus of claim 1, wherein the tilt movement unit includes a set of reduction gears selectively engaging the tilt shaft, a rotation axis of the tilt movement unit being parallel to the rotation axis of the tilt shaft.

3. The pan/tilt camera apparatus of claim 1, wherein the first housing comprises a substantially spherical shape and surrounds the camera.

* * * * *